United States Patent
Bennett

(10) Patent No.: US 10,689,100 B2
(45) Date of Patent: Jun. 23, 2020

(54) AIRCRAFT LANDING GEAR ASSEMBLY

(71) Applicant: SAFRAN LANDING SYSTEMS UK LTD, Gloucester (GB)

(72) Inventor: Ian Bennett, Gloucester (GB)

(73) Assignee: Safran Landing Systems UK LTD (GB)

(*) Notice: Subject to any disclaimer, the term of this patent is extended or adjusted under 35 U.S.C. 154(b) by 0 days.

(21) Appl. No.: 16/573,027

(22) Filed: Sep. 17, 2019

(65) Prior Publication Data
US 2020/0023948 A1 Jan. 23, 2020

Related U.S. Application Data

(62) Division of application No. 15/059,967, filed on Mar. 3, 2016, now Pat. No. 10,464,664.

(30) Foreign Application Priority Data

Mar. 5, 2015 (EP) ..................... 15157806

(51) Int. Cl.
*B64C 25/34* (2006.01)
*B64C 25/42* (2006.01)

(52) U.S. Cl.
CPC .............. *B64C 25/34* (2013.01); *B64C 25/42* (2013.01); *B64C 2025/345* (2013.01)

(58) Field of Classification Search
CPC ....... B64C 25/34; B64C 25/42; B64C 25/405; B64C 25/12; B64C 25/20; B64C 25/10; B64C 25/44; B64C 2025/345; B64C 2025/003
See application file for complete search history.

(56) References Cited

U.S. PATENT DOCUMENTS

| 1,493,022 A | 5/1924 | Clark |
| 2,487,548 A | 11/1949 | Hawkins, Jr. |
| 2,490,485 A | 12/1949 | Spaeth |

(Continued)

FOREIGN PATENT DOCUMENTS

| DE | 1051128 B | 2/1959 |
| EP | 0099319 A2 | 1/1984 |

(Continued)

OTHER PUBLICATIONS

Extended European Search Report for European Application No. 15157806.9, dated Jul. 23, 2015, 4 pages. Jul. 23.

(Continued)

*Primary Examiner* — Assres H Woldemaryam
(74) *Attorney, Agent, or Firm* — RatnerPrestia

(57) ABSTRACT

An aircraft landing gear assembly having a main strut and a bogie beam pivotally coupled to the main strut via a coupling assembly. The coupling assembly is arranged to define a bogie beam pivot axis which is spaced from the landing gear assembly. The coupling assembly includes an arcuate handle portion defined by a first one of the bogie beam and the main strut, and an arcuate passage defined by the other one of the bogie beam and main strut. The arcuate handle portion is slidably housed within the arcuate passage, and the arcuate handle portion and the arcuate passage each define a respective centre point, the respective centre points being coaxial to define the bogie beam pivot axis.

8 Claims, 3 Drawing Sheets

(56) References Cited

U.S. PATENT DOCUMENTS

| | | | |
|---|---|---|---|
| 2,960,289 A | 11/1960 | Westcott | |
| 2,997,261 A | 8/1961 | Westcott | |
| 3,091,418 A | 5/1963 | Pitt | |
| 3,164,223 A | 1/1965 | Kemp | |
| 4,749,152 A | 6/1988 | Veaux et al. | |
| 4,770,372 A | 9/1988 | Ralph | |
| 5,460,340 A | 10/1995 | White | |
| 5,839,692 A * | 11/1998 | Ralph | B64C 25/12 244/102 SL |
| 6,173,920 B1 | 1/2001 | Meneghetti | |
| 6,308,916 B1 | 10/2001 | Hrusch | |
| 9,108,479 B1 | 8/2015 | Calvert | |
| 9,162,756 B2 * | 10/2015 | Menezes | B64C 25/34 |
| 2003/0033927 A1 | 2/2003 | Bryant et al. | |
| 2007/0228825 A1 | 10/2007 | Perriard et al. | |
| 2008/0258014 A1 | 10/2008 | McCoskey et al. | |
| 2012/0126055 A1 * | 5/2012 | Lindahl | B64C 25/22 244/104 FP |
| 2012/0256050 A1 * | 10/2012 | Hilliard | B64C 25/34 244/100 R |
| 2013/0068884 A1 | 3/2013 | Ducos | |
| 2013/0140399 A1 | 6/2013 | Ducos | |
| 2013/0146704 A1 | 6/2013 | Menezes et al. | |
| 2013/0299286 A1 | 11/2013 | Tanty | |
| 2014/0048645 A1 * | 2/2014 | Lacy | B64C 25/36 244/50 |
| 2014/0346273 A1 | 11/2014 | Nelson | |
| 2015/0203195 A1 | 7/2015 | Vatovec et al. | |
| 2015/0298798 A1 * | 10/2015 | Holloway | B64C 25/10 244/102 R |
| 2016/0264235 A1 * | 9/2016 | Sexton | B64C 25/42 |
| 2016/0325825 A1 * | 11/2016 | Baird | B64C 25/36 |
| 2018/0265184 A1 * | 9/2018 | Chiritoiu | B64C 25/34 |

FOREIGN PATENT DOCUMENTS

| | | |
|---|---|---|
| FR | 1253108 A | 2/1961 |
| GB | 767032 | 1/1957 |
| GB | 2101542 A | 1/1983 |

OTHER PUBLICATIONS

Persson et al., "Carbody tilting—Technologies and Benefits", Vehicle System Dynamics, 47(8), (2009), pp. 949-981.

* cited by examiner

AIRCRAFT LANDING GEAR ASSEMBLY

This application is a divisional application of U.S. application Ser. No. 15/059,967, filed Mar. 3, 2016, which claims the benefit of and priority to European Application No. EP15157806.9, filed Mar. 5, 2015, both of which are incorporated herein by reference in their entireties.

BACKGROUND OF THE INVENTION

Single axle landing gear, such as landing gear for aircraft with take-off weights in the range of 70 to 100 tonnes, typically include a strut carrying an axle upon which one or two wheels are mounted. Each wheel is provided with a brake assembly arranged to inhibit rotation of the wheel to slow the aircraft while it is on the ground. Such brake assemblies are generally connected to the strut by local mechanical fixing such as a flange or pin such that the local region of the strut reacts brake torque.

Multi-axle aircraft landing gear typically include a main strut pivotally coupled to a bogie beam which carries the plurality of axles. Each axle generally includes a pair of wheel and brake assemblies. A brake rod is provided for each brake assembly to couple each brake assembly to a remote anchor point on the main strut. Brake rods are used in preference to mechanical fixing in order to overcome the known problem of a pitching moment being induced on the bogie beam during braking.

Known brake rod anchor points can each experience a large bending moment during brake torque reaction and thus present a potential point of failure. They can also increase the lateral space envelope of certain types of multi axle landing gear. Also, if placed below the bogie beam, brake rods and their associated joints can reduce ground clearance (particularly in the event of deflated or lost tyres). If placed above the bogie beam they can restrict the size or position of other features such as torque links or a pitch trimmer.

SUMMARY OF THE INVENTION

In accordance with a first aspect of the present invention there is provided an aircraft landing gear assembly comprising a main strut and a bogie beam pivotally coupled to the main strut via a coupling assembly, wherein the coupling assembly is arranged to define a bogie beam pivot axis which is spaced from the landing gear assembly in free space with respect to the landing gear assembly.

Thus, the coupling assembly is arranged to define a remote bogie beam pivot axis in free space i.e. the pivot point is not physically defined by a part of the landing gear which occupies the pivot point space. As such, the bogie pivot can be defined at locations which previously were not feasible; for example, the bogie pivot can be defined at a location which is level or nearly level with the ground when the aircraft is taxiing such that there will be negligible pitching moment on the bogie as a result of braking forces, enabling the brake assemblies to be locally fixed to the bogie beam and brake rods to be dispensed with.

The coupling assembly can be arranged such that bogie beam pivot axis is below the bogie beam in use.

The coupling assembly can be arranged such that the bogie beam pivot axis is spaced from the bogie beam by a distance corresponding to an in-use ground level when an aircraft including the aircraft landing gear assembly is taxiing.

The coupling assembly can comprise a pair of arms each having an upper pivotal coupling to the main strut and a lower pivotal coupling to the bogie beam. Each arm can be considered to have a connection axis which intersects the axes of its pivotal couplings. The pivotal couplings can be positioned or arranged such that the connection axes intersect at a virtual bogie beam pivot axis which defines the bogie beam pivot axis. Each arm can comprise one link or more than one parallel links which together pivot about a common upper and lower pivotal coupling. Each arm can be elongate and straight.

Alternatively, the coupling assembly can comprise an arcuate handle portion defined by a first one of the bogie beam and main strut, the arcuate handle portion being slidably housed within an arcuate passage defined by the other one of the bogie beam and main strut, the radii of the arcuate handle portion and arcuate passage being so as to define generally coaxial centre points to define a bogie pivot axis which defines the bogie beam pivot axis. The arcuate handle portion or the arcuate passage portion can include rollers arranged to define a bearing surface.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
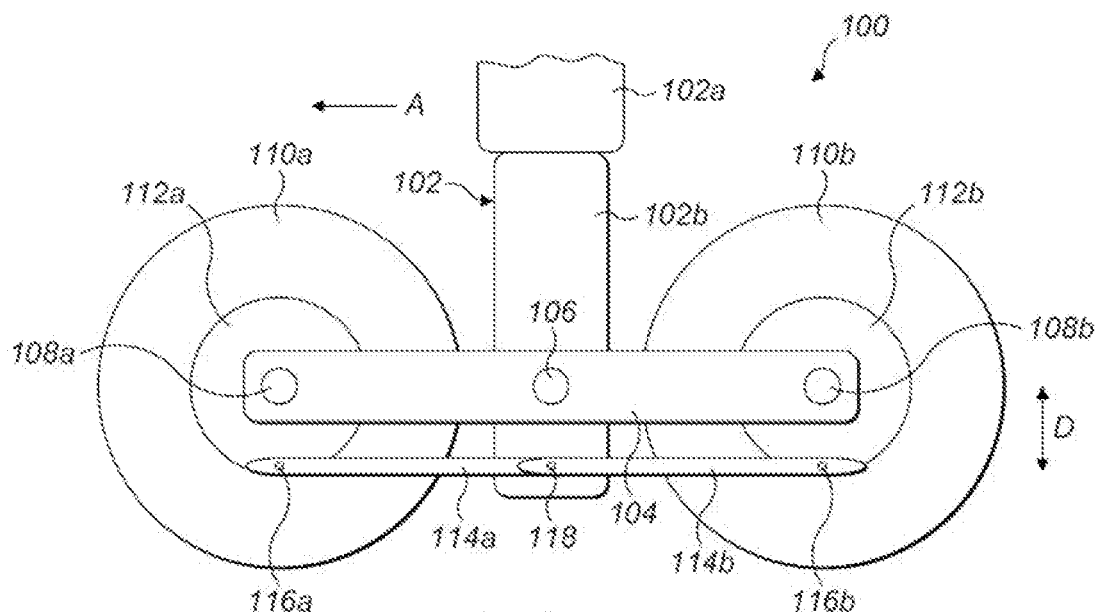
FIG. 1 shows a known landing gear assembly.

FIG. 1 shows a schematic partial side view of a known aircraft landing gear assembly 100. The landing gear assembly 100 has a main shock absorbing strut 102 having a main fitting 102a within which a slider 102b is telescopically housed. A bogie beam 104 is pivotally mounted to a lower end region of the slider 102b at a bogie pivot 106. A torque link (not shown) couples the slider 102b to the main fitting 102a to limit relative rotation about the longitudinal axis of the main shock absorbing strut 102.

The bogie beam 104 carries a first axle 108a fore of the bogie pivot 106. The first axle 108a carries a first wheel assembly 110a and a first brake assembly 112a. The first brake assembly 112a is arranged to apply a braking force to the first wheel assembly 110a. The bogie beam 104 further carries a second axle 108b aft of the pivot axle 106. The second axle 108b carries a second wheel assembly 110b and second brake assembly 112b, the second brake assembly 112b being arranged to apply a braking force to the second wheel assembly 110b. The wheel assemblies 110a, 110b and brake assemblies 112a, 112b are each mounted so as to be freely rotatable about the longitudinal axis of a respective axle 108a, 108b on which they are mounted.

One side of the bogie beam 104 the first brake assembly 112a is mechanically coupled to the landing gear strut 102 via a first brake rod 114a. The first brake rod 114a is coupled to the main strut 102 via an anchor point 118, which may be a pin or the like, and coupled to the first brake assembly 112a via a pin 116a. Similarly, the second brake assembly 112b is mechanically coupled to the landing gear main strut 102 via a second brake rod 114b, the second brake rod 114b being coupled to the main strut 102 via the anchor point 118 and to the second brake assembly 112b via a pin 116b. A corresponding set of brake rods (not shown) are provided on the other side of the bogie beam 104 to react brake torque from wheel and brake assemblies (not shown) on that side of the bogie beam 104.

The pair of brake rods 114a, 114b are generally aligned along their longitudinal axis, which in turn is generally parallel with respect to the longitudinal axis of the bogie beam 104 and spaced from it by a distance D.

In use, with the aircraft travelling in the direction of arrow A, the brake assemblies 112a, 112b may be activated so as to apply a braking force to the wheel assemblies 110a, 110b. The brake rods 114a, 114b are arranged to react the brake torque generated due to the applied braking force. The brake torque from the first brake assembly 112a results in the first brake rod 114a experiencing a compressive force as it reacts the brake torque. The brake torque generated by the second brake assembly 112b is experienced by the second brake rod 114b as a tensile force.

The present inventor has identified that it would be advantageous to dispense with the requirement for brake rods. As a general overview, the inventor has sought to dispense with the need for brake rods by providing a coupling assembly arranged to define a 'virtual' bogie beam pivot axis which is spaced from the bogie beam in free space and can therefore be defined at a location that is level or nearly level with the ground when the aircraft is on the ground.

Figure 2:
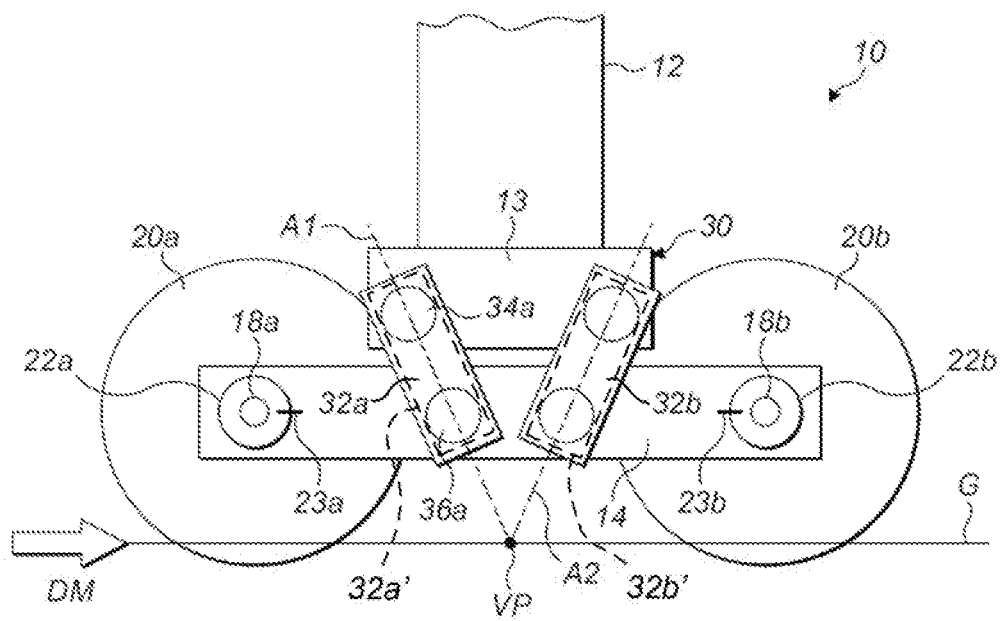
FIG. 2 is a diagram of a landing gear assembly according to an embodiment of the invention.

FIG. 2 shows a schematic, partial side view of an aircraft landing gear assembly 10 according to a first embodiment of the present invention. The landing gear assembly 10 is similar to the landing gear assembly 100 in that it includes a main shock absorbing strut having a main fitting and a slider 12. The bogie beam 14 carries a first axle 18a which in turn carries a first wheel assembly 20a and a first brake assembly 22a. The first brake assembly 22a is arranged to apply a braking force to the first wheel assembly 20a. The bogie beam 14 further carries a second axle 18b which in turn carries a second wheel assembly 20b and second brake assembly 22b, the second brake assembly 22b being arranged to apply a braking force to the second wheel assembly 20a. In other embodiments the bogie beam 14 can carry more than two axles.

The landing gear assembly 10 according to the illustrated embodiment differs from the known landing gear assembly 100 by two main pints of distinction, as will now be described.

Firstly, the brake assemblies 22a, 22b are each coupled to the bogie beam 14 by a local mechanical fixing 23a, 23b, such as a flange or pin like those commonly used to couple a wheel assembly to a strut on a two wheel landing gear. Thus, the landing gear assembly 10 does not include brake rods for reacting brake torque; rather, bogie beam 14 reacts brake torque from points adjacent the brake assemblies 22a, 22b via the mechanical fixings 23a, 23b. As will be appreciated, the stator sides of the brake assemblies 22a, 22b are fixed to the bogie beam so as to be non-rotatably mounted with respect to the bogie beam 14, while the rotor sides rotate with the wheels.

Figure 3:
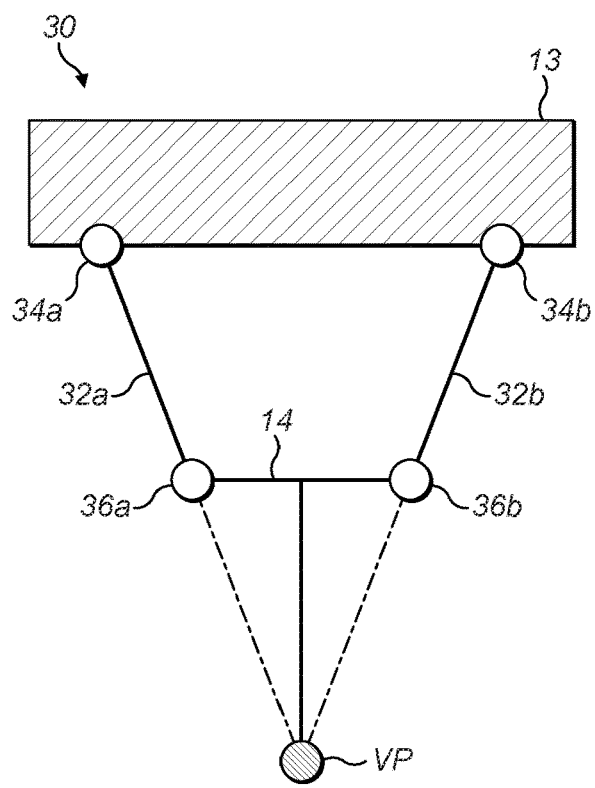
FIG. 3 is a diagram illustrating components of the coupling assembly of FIG. 2.

Referring additionally to FIG. 3, bogie beam pitch compensation under braking is provided by a coupling assembly 30 which is arranged to define a virtual pivot point VP for the bogie beam 14 that is level or nearly level with the ground when the aircraft is on the ground G.

In the present embodiment the coupling assembly 30 comprises a pair of inclined arms 32a, 32b mounted at each side of the bogie beam 14. The first arm 32a has an upper pivot pin 34a via which it is pivotally coupled to a lower portion 13 of the slider 12, and a lower pivot pin 34a via which it is pivotally coupled to the bogie beam 14. Likewise, the second arm 32b has an upper pivot pin 34b via which it is pivotally coupled to a lower portion 13 of the slider 12, and a lower pivot pin 34b via which it is pivotally coupled to the bogie beam 14.

Figure 4:
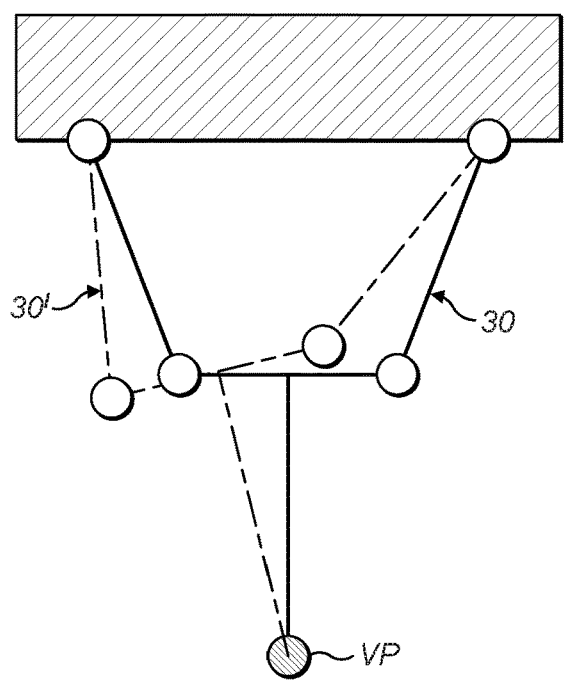
FIG. 4 is a diagram illustrating how components of the coupling assembly of FIG. 2 move in accordance with pivotal movement of the bogie beam.

Thus, the bogie beam 14 can move relative to the lower portion 13 of the slider 12 in a curvilinear motion that approximates rotating or pivotal motion when the bogie beam 14 is close to horizontal i.e. parallel to the ground, as illustrated with additional reference to FIG. 4 in which the assembly 30 is shown solid line for an orthogonal bogie, and a chain dot line assembly 30' shown when the bogie 14 is angularly displaced.

The lower portion of the slider 13 can be enlarged relative to the slider 12 to provide a robust coupling region for the pairs of arms on either side of it.

The first arm 32a has a connection plane or axis A1 which intersects the central axes of its upper and lower pivot pins 34a, 36a. Likewise, the second arm 32b has a connection plane or axis A2 which intersects the central axes of its upper and lower pivot pins 34b, 36b. The pivot pins 34a, 36a, 34b, 36b are positioned such that the connection axes A1, A2 intersect at or close to the virtual pivot point VP corresponding to the ground G when the landing gear assembly is in a taxiing situation. Thus, under braking conditions the amount of angular displacement of the bogie beam 14 is relatively small and hence the bogie 14 will behave as if it is pivoted to the slider 12 at ground level, resulting in negligible pitching moment on the bogie beam 14 as a result of braking forces.

As will be appreciated, the virtual pivot point VP is not an exact single point for the bogie beam 14 because it will move to some extent. For example, as the mechanism deflects in FIG. 4, as illustrated in chain dot line, the virtual pivot point VP will rise slightly compared with FIG. 3 and the solid line. However the rise is small for moderate angles of displacement. There is also a very small lateral movement of the virtual pivot point VP, but this is negligible unless the angular displacement due to bogie pitch is very large. For normal bogie articulation on the ground the virtual pivot point VP is close enough to a single static position to be considered to behave as such. Hence, for small bogie angles it may be considered as if it were pivoting about VP. Put another way, the locus of the virtual pivot point VP dwells in a compact region approximating that shown in FIG. 3 when the bogie beam 14 is within a typical taxiing pivot window that would be expected during taxiing.

The arms 32a 32b are shown as elongate, straight links; it will however be appreciated that they could be other shapes with affecting the locations of the pivot pins 34a, 36a, 34b, 36b. Moreover, in other embodiment the links 32a, 32b can of unequal length and unequal equal angle providing the axes A1, A2 intersect substantially at VP. As shown by dashed lines in FIG. 2, each arm may comprise one or more parallel links such as link 32a' and link 32b'.

Figure 5:
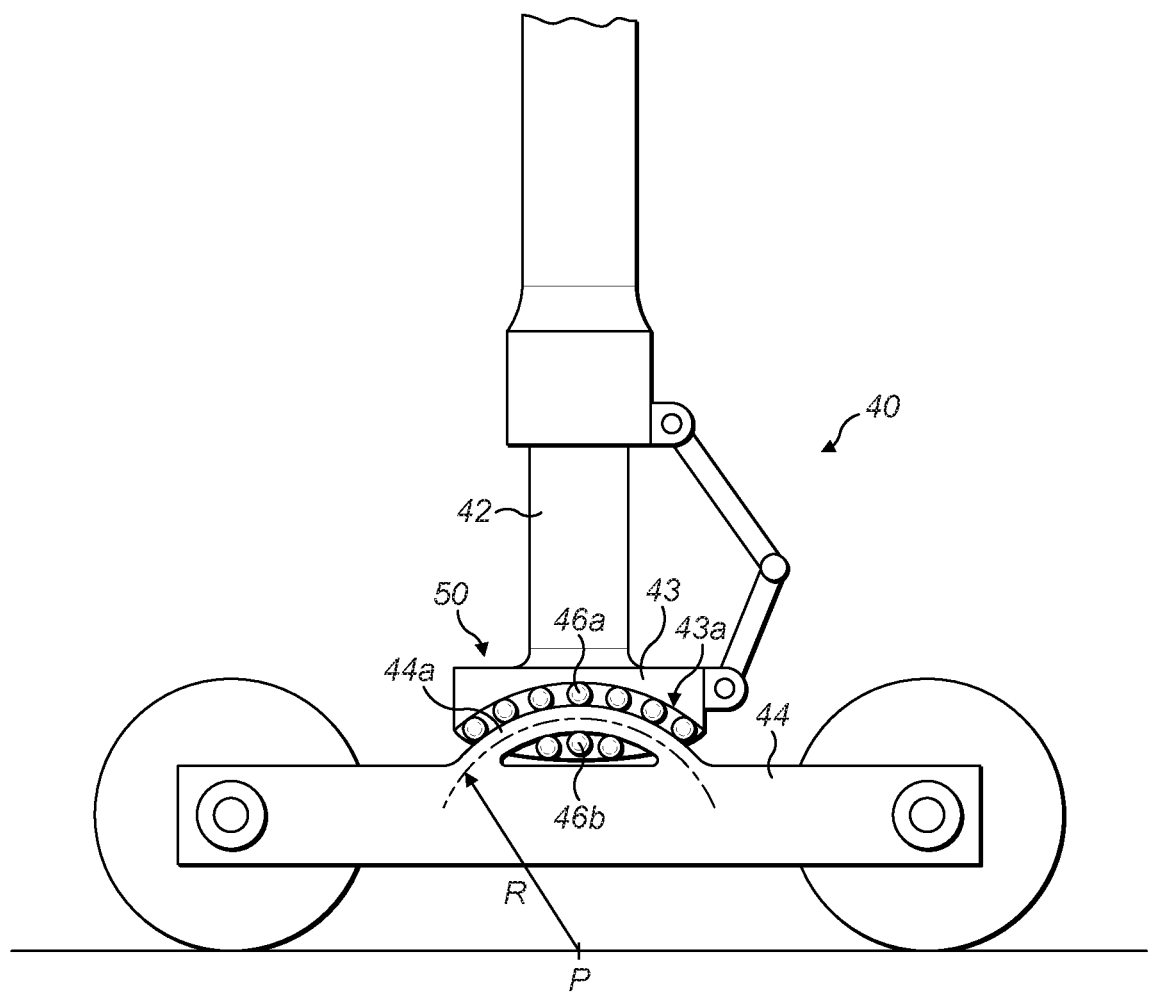
FIG. 5 is a diagram of a landing gear assembly according to a further embodiment of the invention.

Referring now to FIG. 5, a landing gear assembly according to a further embodiment of the invention is shown generally at 40. The landing gear assembly is similar to the landing gear assembly 10 of FIG. 2, but differs in terms of how the coupling assembly 50 causes the bogie beam 44 to behave as if it is pivoted to the slider 42 at ground level.

In the second embodiment, the coupling assembly 50 includes a curved track that can be considered to act like a minor arc portion of a roller bearing. The lower portion of the slider 43 includes an arc shaped channel 43a including an upper string of roller bearings 46a which extend along and follow the upper face of the arc shaped channel 43, and a lower string of roller bearings 46b which extend along and follow the lower face of the arc shaped channel 43. The bogie beam 44 includes an arcuate handle portion 44a which corresponds in size and shape to the arcuate space defined between the upper and lower strings of roller bearings 46a, 46b and is housed within that space. As such, the bogie beam 44 pivots about a point P. The radius R of a central arc extending along the centre of the actuator handle portion 44a defines the location of the pivot point P relative to the coupling assembly 50, enabling the coupling assembly to be configured to cause the bogie beam 44 to behave as if it is pivoted to the slider 42 at ground level. As will be appreciated, the coupling assembly 50 should be configured such that there is a sufficient amount of clear handle track either side of the arc shaped channel 43a to allow full operational movement of the bogie beam 44.

The roller bearings 46a, 46b can be replaced by plain bearings, optionally with a low friction coating, and/or or can be provided on the arcuate handle portion 44a of the slider 44 rather than within the arc shaped channel 43a. In any case, each string of bearings 46a, 46b can be confined within a cage that is restricted by the respective one of the slider portion 43 and bogie 44, or each bearing within a string 46a, 46b can be mounted to the he respective one of the slider portion 43 and bogie 44 via a pivot pin.

Thus, the coupling assembly according to embodiments of the invention is arranged to define a remote bogie beam pivot axis which is spaced from the bogie beam in free space i.e. the pivot point is not physically defined by a part of the landing gear which occupies the pivot space. As such, the bogie pivot can be defined at a locations which previously were not feasible; for example, the bogie pivot can be defined at a location which is level or nearly level with the ground when the aircraft is taxiing, which enables the brake assemblies to be locally fixed to the bogie beam and enables brake rods to be dispensed with. Although ground level can vary somewhat due to surface variations and tyre compression due to aircraft load, it is possible to define the bogie pivot close enough to ground level to result in a negligible pitching moment as a result of braking forces; for example, under braking the difference in vertical load reacted by the front and front and back axles can differ by less than 20%, preferably less than 5% and in some cases less than 2%. In embodiments of the invention about 2.5 cm height difference between pivot P, VP and the ground would give about 2-3% difference in vertical axle loads.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a main strut;
   a bogie beam pivotally coupled to the main strut via a coupling assembly that defines a bogie beam pivot axis that is spaced from the landing gear assembly, wherein the coupling assembly comprises:
      an arcuate handle portion defined by a first one of the bogie beam and the main strut, and
      an arcuate passage defined by the other one of the bogie beam and main strut,
      wherein the arcuate handle portion is slidably housed within the arcuate passage, and
      wherein the arcuate handle portion and the arcuate passage each define a respective pivot point, the respective pivot points being coaxial to define the bogie beam pivot axis.

2. The aircraft landing gear assembly according to claim 1, wherein the bogie beam pivot axis is below the bogie beam in use.

3. The aircraft landing gear assembly according to claim 2, wherein the bogie beam pivot axis is spaced from the bogie beam by a distance corresponding to an in-use ground level when an aircraft including the aircraft landing gear assembly is taxiing.

4. The aircraft landing gear assembly according to claim 1, further comprising at least one brake assembly coupled to the bogie beam in a non-rotatable manner.

5. The aircraft landing gear assembly according to claim 1, wherein the arcuate handle portion or the arcuate passage portion includes rollers arranged to define a bearing surface.

6. The aircraft landing gear assembly of claim 1, wherein the arcuate handle portion comprises a semi-circular protrusion from the bogie beam, the semi-circular protrusion defining the respective pivot point of the arcuate handle portion at a centre of a radius of the semi-circular protrusion.

7. The aircraft landing gear assembly of claim 6, wherein the arcuate passage comprises an arc-shaped channel in the main strut, the arc-shaped channel defining the respective pivot point of the arcuate passage at a centre of a radius of the arc-shaped channel.

8. The aircraft landing gear assembly of claim 7, further comprising a plurality of roller bearings positioned between the semi-circular protrusion and the arc-shaped channel.

\* \* \* \* \*